(No Model.) 2 Sheets—Sheet 2.

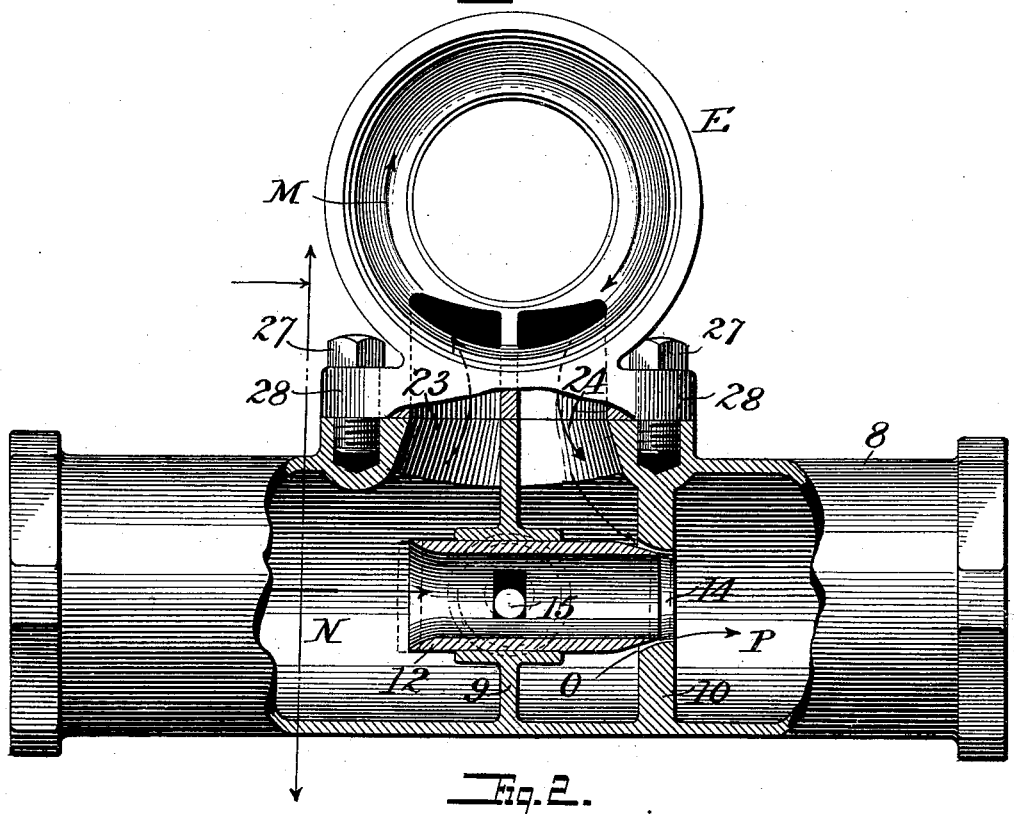
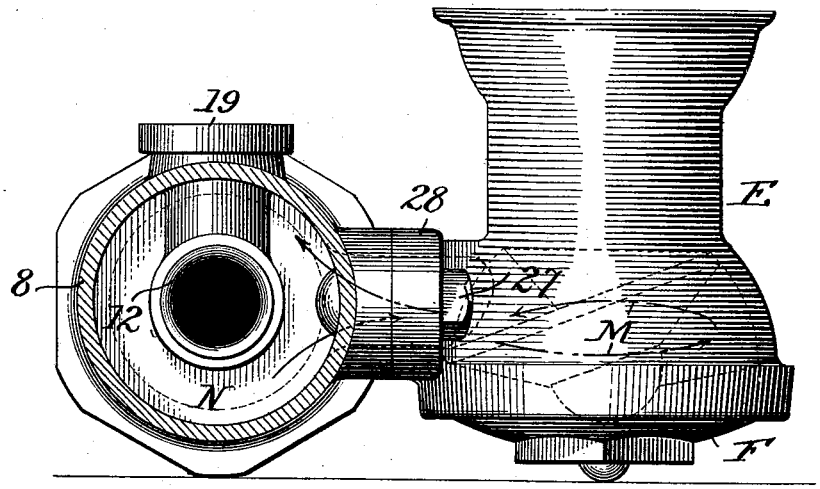

J. THOMSON.
PROPORTIONAL WATER METER.

No. 512,632. Patented Jan. 9, 1894.

Witnesses
Jno. G. Hinkel
A. N. Dobson

Inventor
John Thomson
By Foster Freeman
Attorneys

UNITED STATES PATENT OFFICE.

JOHN THOMSON, OF BROOKLYN, NEW YORK, ASSIGNOR TO THE NEPTUNE METER COMPANY, OF NEWARK, NEW JERSEY.

PROPORTIONAL WATER-METER.

SPECIFICATION forming part of Letters Patent No. 512,632, dated January 9, 1894.

Application filed March 15, 1893. Serial No. 466,123. (No model.)

*To all whom it may concern:*

Be it known that I, JOHN THOMSON, a citizen of the United States, residing in Brooklyn, Kings county, and State of New York, have invented certain new and useful Improvements in Proportional Water-Meters, of which the following is a specification.

My invention relates to proportional water meters, and has for its object to reduce the hydraulic friction—that is, the constant resistance to the flow, such as that due to deflections along the water ways, &c.,—of the flow of the minimum or measured aliquot part of the water, to the least possible amount, as well as to simplify the construction of the device as a whole, and to provide convenient means for adjustment, and my invention consists in the features of construction and arrangement, having the mode of operation substantially as hereinafter more particularly pointed out.

Figure 3:
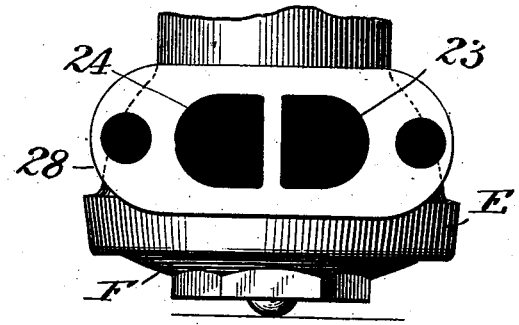
Figure 4:
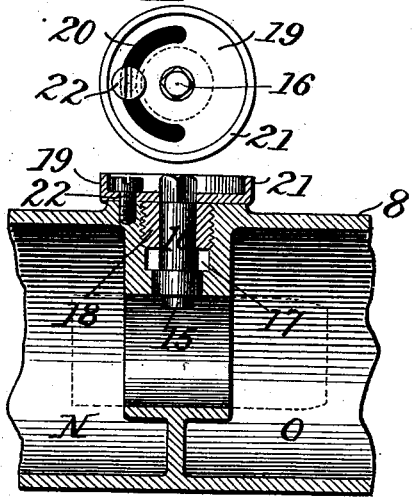
Figure 5:
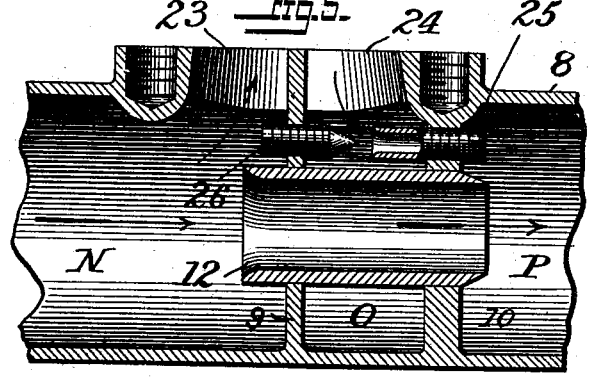

Referring to the accompanying drawings, wherein I have illustrated the preferred embodiment of my invention: Figure 1, is a bottom plan view of the measuring meter, the inclosing cap and internal mechanism being removed, and a part horizontal center section of the main casing and the proportional controlling device. Fig. 2, is an elevation of the measuring meter, and a transverse section of the main casing. Fig. 3, is a detail elevation of the measuring meter, showing the face of the ports. Fig. 4 is a detached detail section and top plan view of a mechanism for calibrating the register of the meter, by varying the proportional flow through the measuring meter; and Fig. 5, is a vertical section showing a modification in a proportional controlling device, and the means for adjustment thereof.

In carrying out my invention, I make use of a measuring meter E, which may be of any suitable construction, but preferably of that type known as the disk action meter, and I prefer to use such a meter as is fully illustrated and described in my prior application, Serial No. 462,744, and in the present drawings I have shown simply the case E of the measuring meter, having an inclosing cap F, but have omitted the details of its internal construction, it being understood as is indicated in dotted lines in Fig. 2, that there is a mutating disk mounted in a suitable chamber, the inlet and outlet of which lie in a horizontal plane, substantially coincident with the disk.

In order to reduce the hydraulic friction to the greatest extent, I attach the measuring disk meter to the proportional controlling device in such a manner that the flow of the measured proportional part of the water is simply caused to be deflected from the main stream in the form of an approximately circular loop, the loop, inlet and outlet all lying in substantially a single plane. It is preferable also that this loop and its ports and connections lie in a horizontal plane, so that the measured portion of the water is not caused to rise or fall in its loop or shunt to and from the main stream. Thus, in the drawings, I have shown the main casing 8, which contains the proportional controlling device, as a cylinder, to the side of which the main casing E of the measuring device is attached. This casing 8 is divided by the diaphragms 9 and 10 into three compartments or chambers N being the inlet, O the intermediate and P the outlet chamber.

The proportional controlling device is shown as a simple cylindrical tube 12, and this is adjustably mounted in the center of the diaphragm 9, its outlet end projecting centrally into a port 14, formed in the diaphragm 10.

The delivering capacity of the proportional controlling tube with respect to the size of the pipe to which the meter is to be attached, is to be restricted sufficiently to cause an adequate difference of pressure between chambers N and P, to operate the measuring meter E at such a minimum rate of flow, as may be desired; that is to say, suppose the ratio of flow between the areas of the proportional controlling tube and that of the pipe in two separate meters to be as one to five or one to ten, then in the one case, there would be a sacrifice of sensibility at low flows to high discharging capacity, while in the other, there would be a loss of discharging capacity at high flows, compensated by increased sensibility at the lower deliveries. It will, therefore, be seen that when the rate of flow through the proportional controlling tube is sufficient to cause such a fall of pressure in the outlet chamber P below that of chambers N and O, a portion of the water will flow through the measuring meter and it is thereby caused to operate, and this operation will be entirely controlled by the discharge from the chamber O through the port 14, and as this port is shown in the present case, this discharge will be in the form of a thin cylinder. The edge of this port within chamber O is preferably rounded or beveled, as shown in the drawings, while the edge of chamber P may be left sharp. The diameter of this port 14, is preferably greater than the internal diameter of the proportional controlling tube or nozzle 12. Thus the discharge from the tube has an inductive effect upon the chamber O. By tapering the external end of the tube where it enters the port, and then setting it in proper relative position, the quantity of water flowing through the port and consequently the rate of operation of the measuring meter, may be regulated to a nicety.

In a former application, Serial No. 458,720, I have shown a means for adjusting the proportional controlling tube in the form of an eccentric stud, as 15 in the present case, adapted to engage a slot in the tube, whereby the tube can be moved back and forth in its bearings to adjust its relation to the discharge port; but the former construction necessitates the withdrawal of the packing screw to operate the said stud. In the present case, I provide the eccentric stud 15 with a spindle 16, which extends outwardly through a packing 17, and a gland nut 18, to the exterior of the main casing 8, and it will be seen that with this construction, the adjustment may be accomplished and the meter standardized while in operation. Further, by attaching the plate 19, to the squared end of the spindle 16, and forming a semi-circular slot 20 in the plate and providing an upturned flange 21, the spindle may be readily adjusted and then securely locked in its adjusted position by the clamping screw 22, and the flanged plate forms a ready means of properly sealing the ports in their ordinary manner. In this way, the register of the meter may be quickly and accurately brought into adjustment or calibrated without the removal of a single screw, by merely adjusting the proportional controlling tube with relation to a port, and thereby increasing or decreasing the quantity of water flowing through the measuring meter. It will be seen that with this construction, the measured stream flows through the port 23, thence through the disk chamber of the meter following the course indicated by the arrows M, forming a loop which is in a horizontal plane, and out through the discharge port 24 of the measuring meter to the intermediate chamber O, and these ports are preferably of large area with relation to the discharge from the port 14, and as the normal mechanical resistance of the disk meter of the type herein shown is very slight, there is comparatively little hydraulic friction, and it is apparent that the delivery of the proportional controlling tube from chamber N and the delivery of the port from chamber O, are under conditions practically constant within all ordinary service requirements, and it is further seen that by means of the eccentric and its connections, the relations of these deliveries may be quickly and accurately adjusted and the measuring devices calibrated while the meter is in operation.

In Fig. 5, I have shown a modification whereby these results may be accomplished when the external adjustment of the tube is not of moment, and it consists in arranging the proportional controlling tube so that it extends through both diaphragms 9 and 10, and fits snugly therein, and in providing a separate tube or port 25 for delivering the measured aliquot part of the water from the chamber O to the delivery chamber P. This tube is made adjustable in the diaphragm 10 and arranged in diaphragm 9 is a tapered screw-threaded stud 26, and the adjustment of the register of the measuring meter may be accomplished by turning either the threaded stud 26, or the tube 25 by means of a screwdriver (or otherwise) inserted from the inlet and outlet ends of the main casing, or through the main ports when the measuring meter is not in place, and while I have shown both adjustable, it is evident that only one need be adjustable.

It will be seen that the measuring meter is secured to the side of the main casing of the proportional meter, as by means of external bolts 27 passing through the flanges 28 of the measuring meter, and seated in proper sockets formed in the side of the main casing 8, and in this way the measuring meter may be readily removed without disturbing the main casing, and this is an essential and practical advantage in many locations of the meter.

While I have thus described the preferred construction and mode of operation of my invention, I particularly call attention to the fact that I have not neglected to consider the result that would ensue by reversing the conditions of operation herein set forth, that is, to make the chamber P the inlet and N the outlet, while O would be the intermediate chamber as at present, and under these conditions the device is operative. I regard, however, the mode of operation first described as the better, for the reasons that the auxiliary effect of induction is utilized with advantage, both as to constancy and sensibility, and also for the reason that the swift current which is injected into the outlet chamber is less likely to carry foreign matter into the working chamber of the measuring meter.

While I have thus described the preferred embodiment of my invention, it will be evident to those skilled in the art, that the details of construction may be varied without departing from the spirit of my invention, and that parts of my invention may be used separately or together, or in connection with other equivalent parts.

What I claim is—

1. The combination with a proportional meter comprising a main casing provided with means for controlling the proportional flow; of a measuring meter connected to the proportional meter, the arrangement being such that the flow of the measured quantity through its circuit from and to the main casing takes the approximate form of a circular loop in a single plane; substantially as described.

2. The combination with a proportional meter, comprising a main casing provided with means for controlling the proportional flow; of a measuring meter connected to said main casing with its inlet and outlet at the side thereof, the arrangement being such that the flow of the measured quantity through its circuit from and to the main casing takes the form of a circular loop in a horizontal plane; substantially as described.

3. The combination with a proportional water meter, comprising a main casing provided with means for controlling the proportional flow; of a measuring meter connected to the side of the proportional meter, the arrangement and construction being such that the flow of the measured volume is first deflected sidewise, thence passes directly into and around the disk chamber, forming a loop, and then passes directly from the disk chamber, into the controlling chamber of the main casing, whereby the entire path of the shunted or measured stream is in a horizontal plane; substantially as described.

4. The combination with a proportional water meter, comprising a main casing provided with a proportional controlling tube and a diaphragm having a discharge port; of a measuring meter secured to the side of the proportional meter and having ports leading to and from the measuring meter of large area with respect to the discharge port; substantially as described.

5. The combination with a proportional meter; of a measuring meter attached to the side thereof, the proportional meter comprising a main casing having two diaphragms forming three chambers, a proportional controlling tube, to deliver the unmeasured portion from the inlet chamber to the outlet chamber, and a port in one of the diaphragms to deliver the measured volume from the intermediate chamber to the outlet chamber; substantially as described.

6. The combination with a proportional meter; of a measuring meter secured thereto, the proportional meter comprising a main casing having two transverse diaphragms, forming three chambers, a proportional controlling tube mounted in one of the diaphragms, and delivering the unmeasured portion from the inlet chamber to the outlet chamber, and a port in one of the diaphragms delivering the measured volume from the intermediate to the outlet chamber, and means for adjusting the flow of the measured portion; substantially as described.

7. The combination with a proportional meter; of a measuring meter, the proportional meter comprising a main casing having two transverse diaphragms, inlet and outlet ports for the measuring meter on opposite sides of one of the diaphragms, a delivery port in the other diaphragm, and a proportional controlling tube mounted in one of the diaphragms and adjustable with relation to the port of the other diaphragm, the arrangement being such that the measured portion passes through the ports and the loop in the measuring meter, in a substantially horizontal plane, and its volume is controlled by the adjustment of the proportional controlling tube with relation to the delivery port; substantially as described.

8. In a proportional meter, the combination with a main casing of a diaphragm, a proportional controlling tube, an eccentric stud connected with said tube, and a spindle connected with the eccentric stud and extending to the exterior of the main casing; substantially as described.

9. In a proportional meter, the combination with a main casing; of a diaphragm, a proportional controlling tube, an eccentric stud connected to the tube, a spindle connected to the stud and extending to the exterior of the casing, a plate connected to the spindle, and means for securing the plate; substantially as described.

In testimony whereof I have signed my name to this specification in the presence of two subscribing witnesses.

JOHN THOMSON.

Witnesses:
J. F. COFFIN,
J. MCKENNON.